Oct. 13, 1953

M. L. EDWARDS 2,655,316

MIXING VALVE

Filed March 27, 1950

INVENTOR.
Miles Lowell Edwards
BY
Atty.

Oct. 13, 1953     M. L. EDWARDS     2,655,316
MIXING VALVE

Filed March 27, 1950     3 Sheets-Sheet 3

INVENTOR.
Miles Lowell Edwards
BY
Atty.

Patented Oct. 13, 1953

2,655,316

UNITED STATES PATENT OFFICE 2,655,316

MIXING VALVE

Miles Lowell Edwards, Portland, Oreg.

Application March 27, 1950, Serial No. 152,156

7 Claims. (Cl. 236—12)

My invention is directed to the mixing of differing fluids, and utilizes the principle of introducing small quantities of separate fluids in an elongated passageway and thereafter mixing or blending them into an intermixture of predetermined relation. Intermediate the inlet end of the elongated passageway and the blending chamber, I provide a pulsing chamber in which I arrange a sensing means which causes pulses of one or both fluids to be introduced into the aforementioned passageway in proper relation to each other quantitatively, so that when said liquids are later blended, the predetermined relationship is attained.

My invention has particular application to hot and cold water mixing valves, and particularly to the use of such valves in domestic systems. At the present time, said valves are deficient, in that pressure variances in the supply of hot and cold water produce a temperature change in the discharge. Many devices have been provided for securing a proper proportioning of hot and cold water and the maintenance of a constant temperature at the discharge end. These involve thermostatic controlling elements and valves directly or indirectly actuated thereby. A substantial time lag between the control element and valves develops inherently in an undamped mechanism and said lag produces a fluctuation in temperature at the discharge end. This lag is caused by two factors which are inherent in the design. They are: (1) the time required for a fluid change to take place between the point of contact of the flows of the two dissimilar fluids and the surface of the thermal sensitive element, and; (2) the time required for the thermal sensitive element to absorb the thermal change and respond thereto. This fluid and thermal lag is difficult, if not impossible, to overcome. It is undesirable because it causes the fluid to issue from the valve in thermal pulses rather than in a thermally uniform stream. I permit these pulses to occur but minimize them as much as possible in the design and dampen them out in a blending chamber so that the intermixture discharged is of constant temperature.

One of the specific features of my invention is to provide a mixing device which includes correlated valves controlling the supply of two fluids, respectively. Said valves are operated by a fluid motor. A pulsing chamber is provided in said mixing device, and within said pulsing chamber, I arrange a heat-sensitive control element which is quickly responsive to the thermal changes which occur in said chamber. Said heat-sensitive control element controls the flow to a pilot means, preferably of the jet type. The control of flow to said pilot means is accomplished so that periodic fluctuations occur in the pulsing chamber, properly related to each other, whereby related small quantities of fluid are introduced into the pulsing chamber to be thereafter blended producing a mixture of the proper proportions. If the two fluids to be blended and intermixed to produce the desired end product are hot and cold water, then the small pulses of hot and cold water are discharged into the pulsing chamber periodically to produce this predetermined end temperature. A thermally uniform end product will result even though the pressures in the supply lines may vary or may differ one from the other, or even though the temperatures of said supplies may vary. This is for the reason that the heat-sensitive control element is responsive to the end temperature desired and will cause related pulses of fluid to be introduced, so that the intermixture thereof will produce the proper end temperature.

A further and more specific object of my invention is to provide a method of combining two thermally dissimilar fluids to effect a predetermined temperature of the discharged intermixture thereof. Said method includes the manipulative steps of rapidly introducing limited, alternate pulses of one of the fluids into a flowing stream. One of said fluids may be considered a control fluid although which particular fluid is so considered is immaterial since my invention contemplates the use of either fluid as a control fluid. Said method involves the sensing of a deviation from a predetermined intermixture, thermally considered, and correcting any deviation from the desired temperature by introducing a pulse of the control fluid in interrupted spurts or in varying amplitude to supply related volumes of fluids of proper thermal relations and thereafter blending the pulsing blend into a thermally uniform discharged stream.

A further and more specific object of my invention is to provide a method of combining two thermally dissimilar fluids to produce a predetermined mix of intermediate thermal characteristics. Such a method includes steps of introducing pulses of each fluid into a stream while, at the same time, forming, discharging, and receiving a jet of one of the fluids. A sensing or condition responsive means is then utilized to sense a thermal deviation from a predetermined norm of the pulsing blend. In response to the sensing means, the jet is periodically intercepted. The jet interceptions are thereafter used to vary the amplitude of the pulse introductions.

A further and more specific feature of my invention is to provide in a fluid jet pilot for controlling a biased fluid motor, a jet nozzle, a receiving nozzle in opposed relation, and to have an intercepting vane movable along a path intermediate the nozzles and intercepting the jet or jets emitted therefrom more or less perpendicular thereto. The nozzles are arranged to discharge jets simultaneously towards each other while the vane is in intersecting relationship during a portion of a cycle of operation. In that said time, said vane presents opposing faces parallel with each other so that the vane will not be flexed or distorted by the opposing action of the two jets. This permits vanes of light construction to be utilized and sensitive operation to be attained in an inexpensive mechanism.

Other and further details of my invention are hereinafter described with reference to the accompanying drawings, in which.

Figure 1:
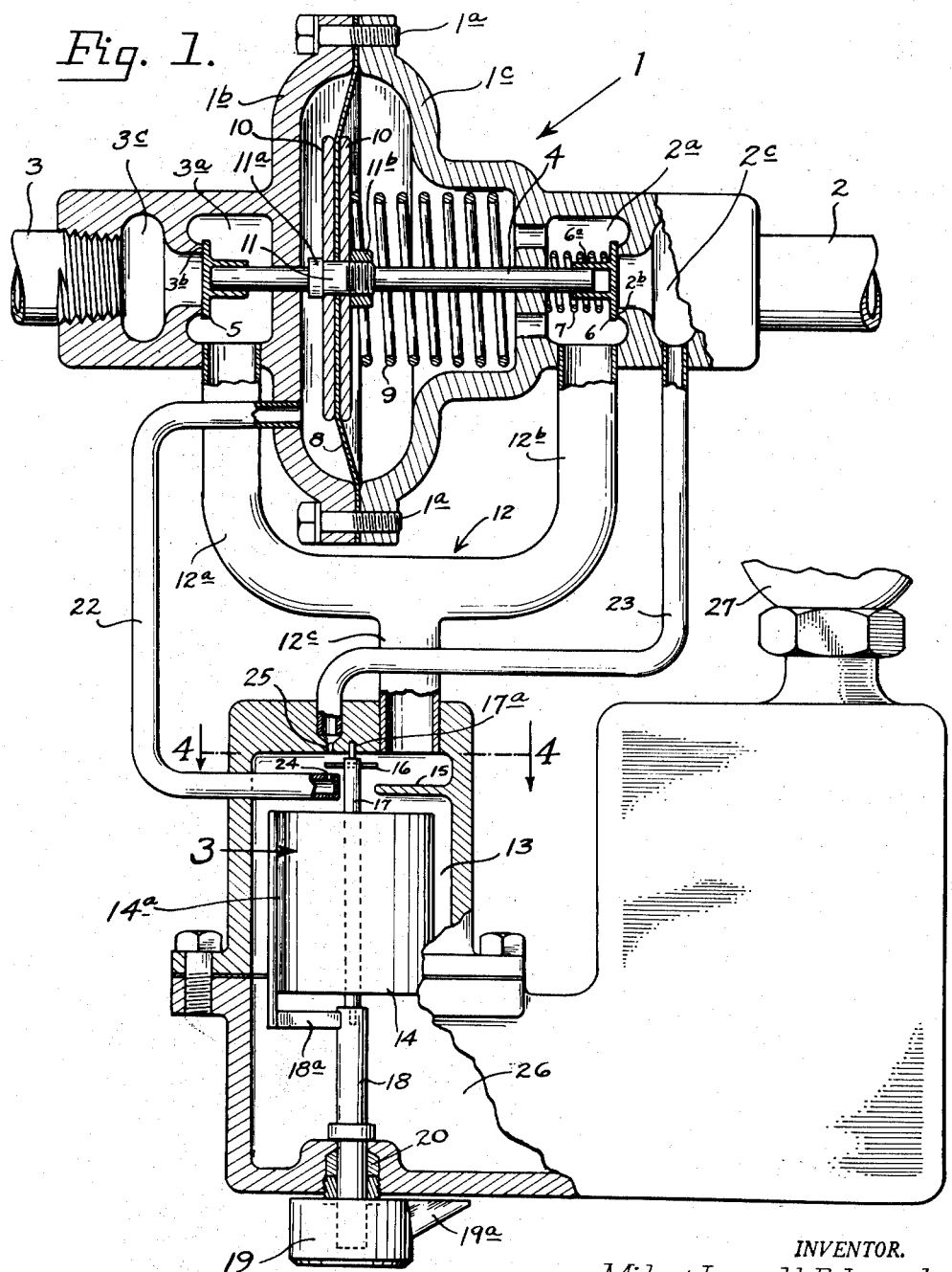
Fig. 1 is a more or less schematic view of a mixing device embodying my invention, the separate portions thereof being shown physically separated for more ready understanding of the details thereof, parts of the device being shown broken away and in section to show details which would otherwise be concealed, and the control valves being shown seated across the inlet ports.
Figure 2:
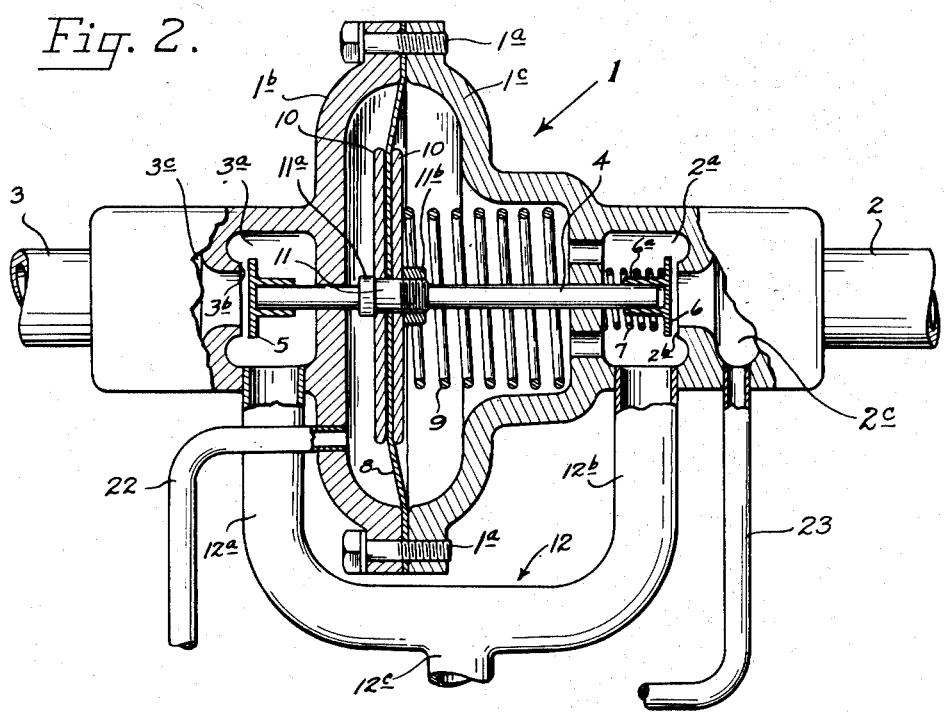
Fig. 2 is a detailed view shown partly in section with the fluid motor actuated to permit the valves to uncover the inlet ports.
Figure 3:
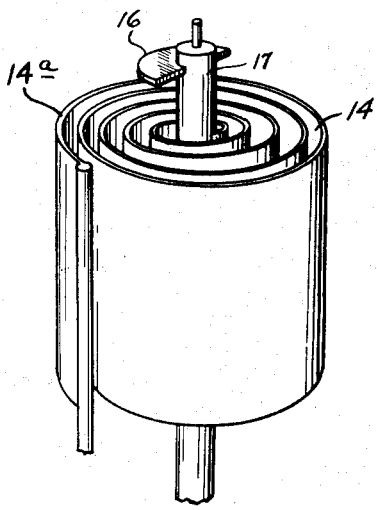
Fig. 3 is a perspective view of a heat-sensitive control element carrying an intercepting vane, said view being taken more or less in the direction of the arrow 3 in Fig. 1.
Figure 4:
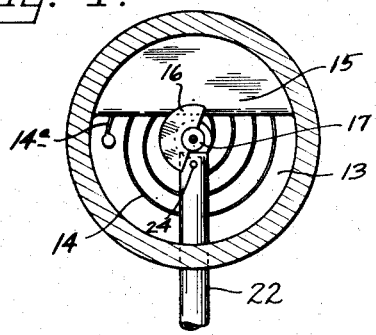
Fig. 4 is a detailed sectional view taken substantially on the line 4—4 in Fig. 1, looking down upon the intercepting vane and the heat-sensitive control element associated therewith.

A mixing device embodying my invention comprises a casing 1 of more or less conventional form, having a fluid pipe 2 discharging fluid into said casing from one side, and a fluid pipe 3 discharging it into the opposite side. If said device is used as a hot and cold water mixing valve, the fluid pipe 2 might be the cold water pipe and the fluid pipe 3 the hot water pipe. The pipe 2 discharges into an inlet chamber 2c which in turn discharges into a valve chamber 2a having a valve seat 2b formed on its discharge or inner end. A similar inlet chamber 3c for the fluid pipe 3 and a similar valve chamber 3a, with a similar valve seat 3b at the end thereof, are also provided. A reciprocatinge valve stem 4 carries a pair of valve heads 5 and 6 at the ends thereof. The valve head 5 is carried by the left-hand end of said stem as viewed in Fig. 1, being either fixed to the stem 4 or slidable thereon, whereas the valve member 6 is slidably mounted on the right-hand end thereof. A helical valve spring 7 encircles the right-hand end of the valve stem 4 and the skirt 6a of the valve 6, and urges the valve head 6 onto its seat 2b. Said spring 7 presents a more or less constant yielding pressure upon the valve member 6 to seat it and said valve is thus spring loaded. The compressive force of the spring 7 is such that it produces a fluid back pressure of approximately five pounds to the square inch in inlet chamber 2c, although this is not critical. It does present a limited but definite restriction to flow from the inlet chamber 2c to the valve chamber 2a.

Extending laterally of the casing 1 and sealed therein is a flexible diaphragm 8, sealed between the halves of said casing and held in place by cap screws 1a joining said casing halves 1b and 1c together. Said diaphragm is caused to be flexed towards the left as viewed in Fig. 1 by the helical compression spring 9. Further, the diaphragm is physically joined to the valve stem 4 by two circular plates 10 at opposite sides of the diaphragm and held in tight face-to-face abutment therewith by a bushing 11 fixed to the stem 4 and having a shoulder 11a thereon and a nut 11b screw-fitted thereto.

A bifurcated conduit 12 communicates at the bifurcated end thereof with said casing, the left-hand branch 12a entering and communicating with the valve chamber 3a, and the right-hand branch 12b entering and communicating with the valve chamber 2a. Thus, if hot water flows into the control valve from the left, as assumed, after it has passed under the valve member 5, it will flow through the left-hand branch 12a to the common stem 12c of said conduit 12. In the same manner, cold water will flow from the fluid pipe 2, through the valve seat 2b, under the valve member 6 and down the right-hand branch 12b to the common stem 12c. The junction point where branches 12a and 12b join, I term the fluid combining point. At this point, discharged pulses of fluid will flow through the common stem 12c into a sensing or pulsing chamber 13.

Although Fig. 1 shows that said common stem 12c is of substantial length, it is to be understood that said length should be maintained at a minimum so the time lag produced by water flowing from the branches 12a and 12b into the pulsing chamber may be maintained at a minimum. In actual construction, said mixing valve will be made in a compact member and the several conduits and pipes will be passageways therein. Fig. 1 shows these parts extended somewhat for ease of illustration and understanding.

Figure 5:
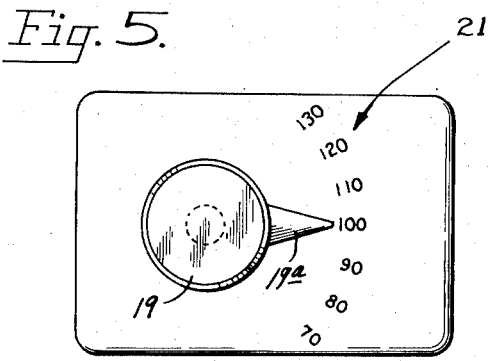
Fig. 5 is a detailed view of the setting knob and the calibrations associated therewith by which a selected temperature may be varied and set with relation to the discharge temperature of the intermixed fluid.

Within the pulsing chamber 13 is a heat-sensitive control element 14. I have illustrated this as a helical coil of bimetallic material. The relative size of said coil and the length thereof is not critical and it does not have to be formed or coiled. It may take any form which suggests itself to a person skilled in the art, such, for example, as a flat strip, a bent strip, or any other form of thermostatic control which lends itself to the use intended. To promote sensitivity, however, I deem it desirable to construct the thermal strip of relatively thin metal to permit rapid absorption of thermal changes. Underlying the point of discharge from the stem 12c and within said sensing chamber is a lateral baffle 15, which causes the emitted pulsating discharge from said stem to be deflected and intermixed somewhat before the intermixture strikes the heat-sensitive element 14. The baffle does not tend to produce a thorough intermixture, but tends to minimize somewhat the sharpness of the change between alternate pulses of the fluid. The heat-sensitive control element thus is directly affected by said pulses and responds thereto, although said pulses have been broken up somewhat by said baffle. I deem it desirable that the flow of fluid shall extend longitudinally of the control element 14, because, in wiping over the surfaces, it is in longer contact with the control element. Joined to the control element is a vane member 16 which, in a helical control element, would be rotated upon change in temperature. This vane is carried by a shaft 17 having a bearing point 17a at the upper end thereof. The lower end of the shaft is journaled in a stub shaft 18 having a control knob 19 at its lower end as viewed in Fig. 1. Said stub shaft extends through the wall of the mixing chamber 26 and is provided with a stuffing box 20 to prevent leakage at this point. The stub shaft also has a radial arm 18a fixed thereto which, at the extremity thereof, joins with the outer turn 14a of the helically wound heat-sensitive control element. The control knob, as shown in Fig. 5, has a pointer 19a formed thereon which moves with relation to an arcuate calibrated scale 21. Said scale, as applied to a hot and cold water mixing device, might be calibrated in selected temperatures within a usable range, as, for example, in ten degrees temperature steps from 70° F. to 130° F. It is in this range that hot and cold water devices are used, for example, in household use. When the knob is turned from the right towards the viewer looking at Fig. 1, it will cause the coil to be more tightly wound, and, in the reverse direction of rotation, it will release the initial tension to which the control element is subjected.

Figure 6:
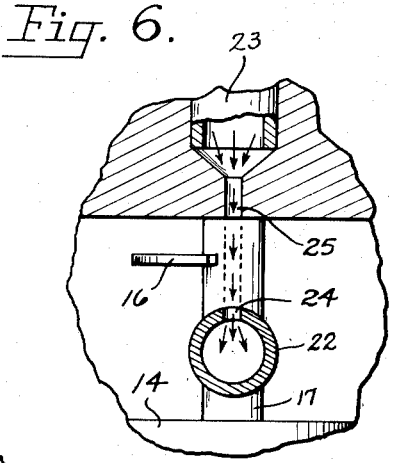
Figs. 6, 7 and 8 are more or less schematic views illustrating the manner in which a jet or opposed jets may be deflected or intercepted by a vane and illustrating the manner in which said vane acts upon said jets in its several positions.
Figure 7:
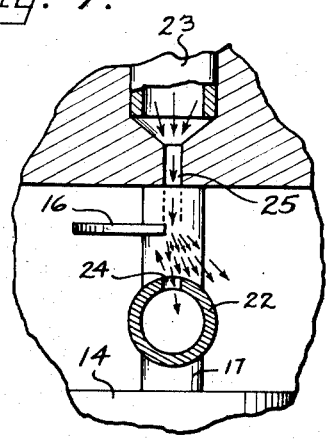
Figure 8:
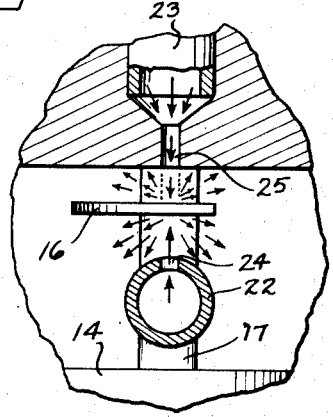

Pilot conduits 22 and 23 extend between the casing 1 and the sensing or pulsing chamber 13, respectively. The pilot conduit 22 joins the casing at the left-hand side of the flexible diaphragm 8, and the conduit 23 joins it at the right-hand side. The point of communication of the conduit 23 is within the inlet chamber 2c. Thus, the constant pressure differential existing across the valve 6 because of the bias force of the spring 7, is caused to also exist across the pilot conduit 23 and the conduit 12b. A jet is, therefore, constantly emitted from a jet nozzle 25 in the sensing chamber, since the pressure differential of approximately 5 pounds per square inch is carried respectively to the nozzle 25 via conduit 23 and to the pulsing chamber 13 via the conduit 12b, 12c. The conduit 22 communicates with the interior of the casing 1 at the left-hand side of the diaphragm 8, and thus fluid is discharged through said conduit 22 and is emitted from the lower or receiving nozzle 24 at the end thereof only when the diaphragm is urged toward the left under the influence of the helical compression spring 9. Where the stem 4 passes through the wall of the casing immediately to the right of valve chamber 3a, it is essentially sealed. Thus the space within the casing to the left of the diaphragm 8 is emptied and filled, respectively, as water flows downwardly through the conduit 22 and flows upwardly therein, respectively. The jet emitted from the nozzle 25 is directed by the bore thereof as a smooth surfaced, cylindrical body or a smooth surfaced, cylindrical jet into the receiving nozzle 24 in the manner illustrated in Fig. 6 when the vane does not intercept its path. This generates a pressure within the bore of the conduit 22, tending to cause water to flow upwardly therein and to be discharged within the casing at the left of said diaphragm 8. When the vane moves into intercepting position, as shown in Fig. 7, it tends to break up said jet and to deflect it so that the diaphragm, urged by the helical spring 9, will cause fluid to flow downwardly through the conduit 22 and emit a jet from the nozzle 24 upwardly in the manner illustrated in Fig. 8. At said time, two opposed jets strike the opposite faces of the vane member 16, and inasmuch as their velocities are more or less equal, said vane will not be deflected; that is to say, the vane preferably is provided with parallel sides, and the path that the vane follows as it moves into and out of intercepting relation with the jet or jets is substantially normal to the axis of said jets, and thus said vane presents parallel faces with which said jets react. This arrangement permits the vane to be constructed of light material and results in a more sensitive operation thereof. In Fig. 8, the degree of entry of the vane into and through the jet has been exaggerated for emphasis. With a sensitively constructed device, said vane will only brush and disturb the peripheral outline of a jet between pulsations. However, while a brush rather than a full interception may sometimes be desirable, it is not a factor critical to the efficient operation of a jet pilot relay. Accordingly, with a nozzle diameter of 0.040 inch and a vane thickness of substantially the same dimension, I have found that a brush of the jet will give enough control to reverse the motor controlled thereby when such brush effects an interception of only 0.006 inch. As can be seen in Figs. 6 to 8 inclusive, however, I have illustrated and found to be entirely practical a vane construction wherein more than a mere brush interception takes place. In the illustrated form, the inertia of the vane carries the same through to a complete interception position (see Fig. 8). It is true, in any event, that, as the vane brushes against and disturbs the peripheral outline of the downwardly directed jet, it intercepts the latter and the vane will be arranged with respect to the upwardly directed jet in the same relative position as it is arranged with respect to the downwardly directed jet. In other words, the degree of entry into said jet or jets will be the same, because the nozzles directing said jets are in relatively close proximity and are co-axial and of approximately the same diameter. The separation of the nozzles in the several figures has been exaggerated for ease of understanding. In practice, relatively close spacing with each other and with the faces of the vane will be maintained.

At the discharge side of the sensing chamber, I have provided a blending chamber 26. This blending chamber preferably possesses characteristics which promote turbulence and intermixture. The capacity thereof should be substantial so that a more or less prolonged period of time elapses while the intermixed fluids pass therethrough. Thus, as shown in Fig. 1, the blending chamber 26 is of substantially greater size than the pulsing chamber 13. Such will tend to promote blending and will give the predetermined uniformity of mixture desired as the end result. At the discharge side of the blending chamber is preferably arranged a discharge valve 27 to regulate the flow of the intermixture from the blending chamber.

In the operation of my mixing valve, it being assumed fluid pipe 2 is connected to a cold water source and fluid pipe 3 is connected to a hot water source, the control knob 19 is first set at the desired temperature. The discharge valve 27 is then opened to give the desired quantity of flow from the valve. As is usual in domestic water supplies, the water first issuing from the hot water pipe is usually at a temperature below that at which it later issues, this being understandable because the hot water has probably been standing in the pipe for some time. Therefore, the initial water entering the sensing or pulsing chamber 13 will be below the temperature for which the mixing valve is set. In order to correct the water temperature and bring it up to the set temperature, more hot water will be required than cold water.

Assuming, now, that the valve 27 is open, the following steps take place:

The jet nozzle 25 immediately forms a jet which is caught in the lower or receiving nozzle 24, since the pilot conduit 23 is connected to the cold water supply upstream of the valve 6. When this jet is impressed upon the receiving nozzle 24, pressure is built up on the left-hand side of the diaphragm 8, causing it to move to the right, thereby decreasing the amplitude of the opening of the cold water valve 6 and increasing the amplitude of the opening of the hot water valve 5. When the resulting thermal pulse of relatively warm water flows through the bifurcated conduit 12c and reaches the heat sensitive element 14, it causes the vane member 16, in response to a signal from this element 14, to intercept the jet issuing from the jet nozzle 25. This action reduces the pressure in pilot conduit 22, whereupon the helical spring 9 forces the diaphragm to the left, causing the fluid in the conduit 22 to be emitted from the receiving nozzle 24. Movement of the diaphragm 8 to the left will decrease the amplitude of the opening of the hot water valve 5 and increase the opening of the cold water valve 6, completing one cycle of operation. It is half of one of these thermal cycles which I choose to term a "pulse" of fluid and, it should be noted, the term as defined includes a changed thermal rate of flow as well as or in addition to an actual secession of one type of thermal flow. Each such pulse is, in fact, a definite quantity of fluid possessing a thermal characteristic either above or below the thermal characteristic for which the heat-sensitive element 14 is set. Thus the fluid flowing over the heat-sensitive element 14 in the sensing or pulsing chamber 13 is at all times made up of these pulses. The pulses follow one another out of the conduit 12c and into the pulsing chamber in a manner similar to a flowing stream made up of successive slugs of thermally dissimilar pulses. The oscillations of the inlet valves which cause these pulses to form is an essential feature of my invention.

Many patented hot and cold mixing valves are, by their inventors own admissions, afflicted with a natural tendency to "hunt." This tendency, defined as an oscillation back and forth across the desired delivery temperature or, the rate of such oscillation, is evident when one examines the operation of a typical mixing valve. Control of the hot and cold inlet valve openings is effected by a thermostatic element which senses the outlet port temperature and corrects the inlet valve openings accordingly. Because the thermostat is located some distance downstream from the inlet valves, and because of the inherent inertia of both the thermostat and the inlet valves, a time lag invariably occurs between the instant a thermally undesirable quantity of fluid enters the valve and the instant the inlet valves respond to the undesirable condition to effect a correction thereof. It is this time lag which causes the oscillations since, by the time one correction is made, another correction has already been called for by the thermostat. Thus, in actual operation, the inlet valves have a natural tendency to oscillate back and forth into positions delivering temperatures above and below the exact point of regulation.

The oscillations thus inherent in a mixing valve have, to date, been considered undesirable and many inventions have been concerned with ways and means to decrease their rate or to "damp out" their effect. My mixing valve, however, does not seek to minimize the hunting characteristics inherent therein. It does not seek to decrease the oscillation rate. Instead, the mixing valve of my invention accepts the continuous oscillations as a necessary evil. It does not provide an intermediate position of stability at which the inlet valves come to rest. In practice, I seek to increase the oscillation rate as much as possible by placing the fluid combination point close to the thermal element and by providing a sensitive thermal element to respond as quickly as possible to temperature changes, thereby reducing over compensation. The method and apparatus for utilizing these inherent oscillations to deliver a constant controlled temperature end product are, therefore, within the scope of one object of my invention.

Similarly, many fluid jet relay controls are now on the market. These usually comprise a jet nozzle to which fluid is continuously fed at a constant pressure. Opposite thereto is an orifice or a receiving nozzle, as it is sometimes termed, which receives fluid from the jet formed by the first nozzle. The pressure thereby built up in the orifice or receiving nozzle is utilized to move a piston, diaphragm, or bellows motor and control of the pressure is had by moving a vane between the nozzle and orifice to intercept the fluid jet. When the vane allows the jet to enter the orifice, fluid pressure causes the motor to move in one direction and when the vane intercepts the jet, a spring moves the motor back against the then reduced fluid pressure. It is such a jet relay, with one essential improvement thereto, which my invention utilizes. The improvement, however, is vital and can be best understood by examining the usual interception vane employed in present day relays.

Such vanes are deficient in that they present either beveled faces and/or oblique surfaces to intercept the jet which they seek to control. I have discovered that this deficiency manifests itself in the force with which a vane must be thrust forward to intercept the jet. Thus, if a beveled, rounded, or sloped surface vane face is presented to the jet, the force of the moving jet stream tends to thrust the vane back out of or draw it into intercepting relationship therewith. The force a jet exerts upon the attacking face of a vane entering the jet will cause a reaction on that face normal to its surface. This reaction force is substantial when compared to the small force which the condition responsive element exerts in opposition thereto and acts in a direction to move the vane either out of interception with the jet or to prevent removal of the vane from interception therewith once effected. A further object of my invention, therefore, is to reduce the force required to effect a jet interception by constructing a vane interception face which is flat and squared off as opposed to a beveled or rounded face and which moves in a path parallel to its own surfaces.

I claim:

1. A mixing device comprising biased fluid motor oscillated inlet valves, a pulsing chamber, and a blending chamber, all joined in series; motor pilot means for actuating said fluid motor, said pilot means including a jet nozzle communicating with one of said inlet valves, a receiving nozzle means mounted opposite said jet nozzle and connected to said motor for overcoming said bias, an interception vane movable between said nozzles, said jet and receiving nozzles and said vane all being mounted within said pulsing chamber, and sensing means in said pulsing chamber responsive to a deviation from the norm of the pulses therein for oscillating said vane into and out of the path between said nozzles, said blending chamber being physically separated from and larger than said pulsing chamber.

2. A mixing valve comprising fluid motor actuated hot and cold inlet valve means for introducing alternate pulses of hot and cold water to said valve adjacent a fluid pulse combining point, and a blending chamber all in series; said blending chamber being physically removed from said fluid combining point, jet pilot means for controlling said fluid motor, said jet pilot means including a jet nozzle fed by inlet pressure, a receiving nozzle means opposite thereto for impressing the jet nozzle pressure on one side of said motor, a movable vane between said two nozzles, said jet and receiving nozzles and said vane all being mounted adjacent said fluid combining point, and means responsive to the temperature of the combined fluid pulses adjacent said fluid combining point for oscillating said vane into and out of the path between said nozzles continuously, said fluid motor being mounted intermediate said inlet valves and the opposite side thereof being exposed to the cold water inlet pressure in opposition to the jet nozzle pressure.

3. A method of combining two thermally dissimilar fluids to deliver a predetermined blend of intermediate thermal characteristics comprising the steps of continuously and in rapid sequence introducing alternate pulses of each fluid into a stream while discharging and receiving a jet of one of the fluids within said stream, sensing the alternate pulses and a thermal deviation from a predetermined norm of the pulses, periodically continuously intercepting and freeing the jet reception in rapid sequence in response to the sensing step, varying the amplitude of the pulse introductions in direct proportion to the interception amplitude to correct the deviation, and blending the pulses into a thermally uniform end product after they have passed through said sensing step.

4. A mixing device, comprising a hollow casing bounding a pulsing chamber and a separate blending chamber, said pulsing chamber having an inlet end and an outlet end, said blending chamber being substantially larger than said pulsing chamber and communicating with the outlet end thereof, oppositely disposed first and second inlet ports communicating with the inlet end of said pulsing chamber, an oscillatory fluid motor mounted intermediate said ports and carrying first and second inlet valve means for controlling flow through said respective ports, sensing means in said pulsing chamber for controlling said fluid motor oscillations, an outlet port communicating with said blending chamber, and valve means controlling flow through said outlet port.

5. A mixing device, comprising a casing having a hollow chamber with first and second inlet ports communicating therewith, a fluid motor common to and carrying first and second valve means for controlling flow to said chamber from said first and second ports, respectively, first spring means for biasing said fluid motor toward closure of said first valve, second spring means independent of said first spring means and bearing on said second valve for maintaining a constant back pressure upon said second inlet port, feed nozzle means communicating with said second inlet port upstream of said second valve and utilizing said back pressure to project a pressure jet of fluid into said chamber, receiving nozzle means opposite said feed nozzle for impressing the jet pressure upon said motor in opposition to said fluid motor bias, and vane means mounted intermediate said nozzles and responsive to a condition of the fluid entering said chamber selectively to intercept said jet.

6. A method for combining two thermally dissimilar fluids to deliver a blend of preselected intermediate thermal characteristic, comprising defining an elongated restricted course having a first inlet end and a second outlet end, discharging said fluids into the first inlet end of said course simultaneously and continuously, varying the respective discharge volumes of said fluids inversely and continuously to define a steady flow of alternate fluid pulses having thermal characteristics above and below said preselected characteristic, respectively, sensing the amplitude of each of said alternate fluid pulses adjacent said first end, providing a constant back pressure upon one of said fluids, directing said one fluid back pressure into a jet, emitting and receiving said jet within said course, selectively intercepting said jet in response to said amplitude sensing to vary the pressure of said jet reception, varying said discharge volumes in proportion to the pressure of said jet reception, the amplitude of each such interception being related directly to the amplitude of said alternate fluid pulses, and blending the alternate pulses adjacent the second end of said course.

7. A mixing device, comprising a hollow casing bounding a pulsing chamber having an inlet end and an outlet end, oppositely disposed first and second inlet ports communicating with said inlet end, an oscillatory fluid motor mounted intermediate said inlet ports and carrying first and second inlet valve means for controlling fluid flow through said respective ports, one side of said fluid motor communicating with said second inlet port, feed nozzle means communicating with said second inlet port to project a pressure jet of fluid into said pulsing chamber, receiving nozzle means opposite said feed nozzle and communicating with the opposite side of said fluid motor to impress the jet pressure thereon, and vane means responsive to a condition of the fluid in said pulsing chamber to intercept said jet repeatedly in rapid sequence.

MILES LOWELL EDWARDS.

References Cited in the file of this patent

UNITED STATES PATENTS

| Number | Name | Date |
|---|---|---|
| Re. 11,148 | Easton | Mar. 3, 1891 |
| 1,978,502 | Moller | Oct. 30, 1934 |
| 2,214,147 | Scott | Sept. 10, 1940 |
| 2,254,098 | Ziebolz | Aug. 26, 1941 |
| 2,517,056 | Trubert | Aug. 1, 1950 |

FOREIGN PATENTS

| Number | Country | Date |
|---|---|---|
| 253,317 | Great Britain | June 17, 1926 |
| 633,185 | France | Oct. 22, 1927 |